Aug. 12, 1969  S. T. FURR  3,460,380
SIMPLIFIED TORSION STRESS RELAXATION TESTING JIG
Filed Jan. 12, 1968
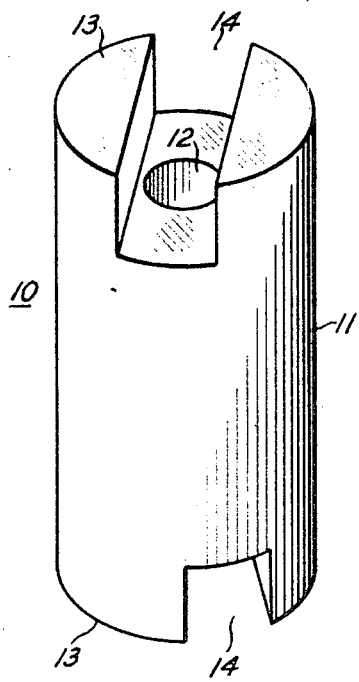
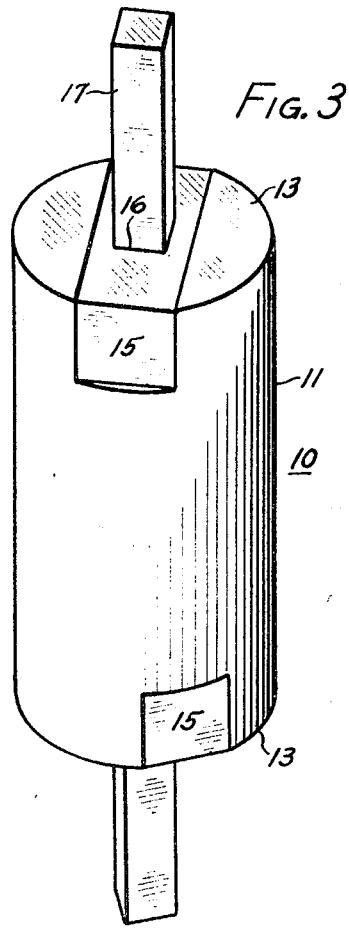
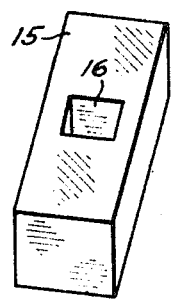
INVENTOR
Samuel T. Furr

United States Patent Office 3,460,380
Patented Aug. 12, 1969

3,460,380
SIMPLIFIED TORSION STRESS RELAXATION TESTING JIG
Samuel T. Furr, Allentown, Pa., assignor to Bethlehem Steel Corporation, a corporation of Delaware
Filed Jan. 12, 1968, Ser. No. 697,358
Int. Cl. G01n 3/22
U.S. Cl. 73—99                                    1 Claim

ABSTRACT OF THE DISCLOSURE

A jig for testing a laboratory size torsion relaxation stress specimen consisting of a holder having an axial bore, two end faces, a diametrically disposed slot in each end face and two retaining bars formed to fit into the slots in the holder. Each transverse retaining bar has a non-circular bore contoured to fit and hold the end portions of a torsion relaxation test specimen. When initially assembled on the test specimen the angular relationship of the retaining bars is different from that of the slots in the holder. On application of torque to the test specimen the retaining bars can be inserted into the slots in the holder and will maintain the test specimen under torque.

BACKGROUND OF THE INVENTION

Torsion tests in which a specimen is subjected to a torsional load which stresses the specimen to actual rutputer or to repeated cycles of a torsional load may not be indicative of the manner in which the structural material will react under actual working conditions. This is true of steels which are used for springs, for example, coil springs in the automotive industry. One test adopted by the automotive industry to determine the load loss or curb height loss of coil springs requires that a full scale coil spring be manufactured from the steel. The coil is heat treated, shot peened and treated prior to testing. The finished coil spring is then subjected to a compression stress sufficient to depress the spring to a maximum. The spring is kept under the applied compression for a desired length of time after which it is released and loads are applied thereto to determine its ability to return to a desired curb height. While the test in itself is simple, the manufacture and heat treatment of full scale coil springs for testing purposes is costly and wasteful of materials.

It is therefore the object of this invention to provide a torsion relaxation test jig which will allow the use of a laboratory type test specimen to evaluate steels for use as springs.

SUMMARY OF THE INVENTION

Broadly the invention comprises a metallic test specimen holder having an axial bore and two end faces, each face having a transverse slot diametrically disposed therein and two retaining bars conforming to the shape of the slots and contoured to fit closely therein. Each retaining bar has a non-circular bore contoured to grip the end portions of the test specimen.

BRIEF DESCRIPTION OF THE DRAWINGS

FIG. 1 is a front elevation view of the test specimen holder.

FIG. 2 is a front elevation view of one of the two identical retaining bars.

FIG. 3 is a view of a test specimen in the loaded position in the jig of the invention.

DESCRIPTION OF THE PREFERRED EMBODIMENT

Referring now to the drawings, FIG. 1 shows the test specimen holder generally at 10. The holder 10 is a right cylinder having end faces 13. Each end face has a diametrically disposed slot 14 formed therein. As shown, the slots 14 are in an angular relationship to each other. The holder 10 is provided with an axial bore 12 perpendicular to the end faces 13 thereof and extending the length of the holder. The bore is of sufficient size to allow a torsion relaxation test specimen to be passed therethrough. While I have shown the holder as a right cylinder, other cross-sectional shapes may be employed.

Since the torsion relaxation test requires that the test specimen be placed in torsion to be tested, it is necessary to provide means to hold the test specimen in a twisted condition in the test specimen holder for a desired length of time. This is accomplished by providing two identical retaining bars 15 shown in FIG. 2. The width of the retaining bars 15 is such that they fit closely in the slots 14. Each retaining bar 15 has a transverse rectangular bore 16 contoured to fit rectangular portions on the ends of the test specimen.

FIG. 3 shows a torsion relaxation test specimen in the holder with the retaining bars engaged in their mating slots after a torsional load has been applied to the specimen. In order to place the specimen in the holder the test specimen 17 is inserted in the holder 10 through the axial bore 12. A retaining bar 15 is placed on each of the specimen 17 to grip the specimen. One retaining bar 15 is placed in its mating slot 14 in one end of the cylinder 11. The assembly is then placed in a conventional torsion testing machine and a torque applied to the specimen to twist the specimen through an angle (the angle of twist) sufficient to allow the other retaining bar 15 on the opposite end of the test specimen 17 to become seated in the slot 14 on the face of the holder 10. The assembly is removed from the machine. The test specimen is now in torsion and may remain under torsional stress as long as desired. To release the test specimen, the assembly is again placed in the torsion machine and a torque sufficient to allow the release of one retaining bar from its mating slot is applied to the specimen. The torque is released, the assembly is removed from the machine and the test specimen released from the holder.

The slots in the end faces of the test specimen holder may be angularly disposed as shown and described herein to achieve the angle of twist in the test specimen. Alternatively the slots may be parallel and the gripping portions in the test specimen may be angularly disposed to obtain the desired angle of twist, or the slots may be parallel and non-circular bores 16 in the retaining bars 15 may be in an angular relationship with each other.

I claim:
1. A jig for holding a torsion stress relaxation test specimen having non-circular end portions comprising:
a metallic holder having an opening extending axially therethrough and end faces, each end face having a diametrically disposed slot therein,
two retaining bars conforming to the shape of said slots and adapted to fit closely therein, each of the retaining bars having a transverse bore therein adapted to grip the non-circular end portions of the test specimen in an angular relationship different from that of the slots in the holder, whereby, upon application of torque to the test specimen, the bars can be introduced into the slots and will hold the specimen in torsion.

References Cited

UNITED STATES PATENTS

| 233,712 | 10/1880 | Thurston | 73—99 |
| 2,454,850 | 11/1948 | Van Winkle et al. | 73—103 XR |
| 2,989,872 | 6/1961 | Dvoracek | 73—99 XR |
| 3,117,443 | 1/1964 | McClelland et al. | 73—103 |

LOUIS R. PRINCE, Primary Examiner

J. NOLTON, Assistant Examiner

U.S. Cl. X.R.

73—103